United States Patent Office 3,227,690
Patented Jan. 4, 1966

3,227,690
POLYMERIZATION OF TRIOXANE IN A
TWO-PHASE LIQUID SYSTEM
George W. Polly, Jr., Corpus Christi, Tex., Francis B. McAndrew, Springfield, N.J., and Walter E. Heinz, Hattersheim, Frankfurt, Germany, assignors to Celanese Corporation of America, New York, N.Y., a corporation of Delaware
No Drawing. Filed July 16, 1962, Ser. No. 210,206
7 Claims. (Cl. 260—67)

This invention relates to an improved method of making high molecular weight polymeric materials by the polymerization of trioxane in a two-phase liquid system.

U.S. Patent 2,989,505, issued June 20, 1961, to Hudgin and Berardinelli, discloses the polymerization of trioxane in a two-phase liquid suspension system wherein trioxane-rich droplets are suspended in a non-solvent liquid and polymerized. The method produces a uniform particulate product at a high conversion rate.

It has been found however that there is a tendency for a portion of the polymer formed to adhere to the walls of the reaction vessel. This reduces the effective yield of free-flowing polymer and eventually clogs the reaction vessel. In addition, the adherent polymer reduces the heat transfer through the walls of the reaction vessel and makes it difficult to control the reaction temperature by external cooling.

It is an object of this invention to provide an improved polymerization method whereby coating of the reaction vessel walls is minimized and whereby heat transfer through the vessel walls is maintained at a high level. Other objects will be apparent from the following detailed description and claims.

In accordance with one aspect of this invention, there is provided in the catalytic polymerization of trioxane in a suspension system comprising a discontinuous trioxane-rich phase suspended in a continuous phase containing an inert non-aqueous liquid which is at least partially a non-solvent for trioxane, the improvement which comprises contacting the polymerization mass in a unit of space of the polymerization zone with non-polymerizable solid material brought in gross quantity into said unit of space from a source outside of said unit of space.

The substantially non-polymerizable solid material may be any inert material but is preferably one which does not provide a product separation problem. It may, for example, be added to the polymerization zone before, at the same time as, or after the initiation of the polymerization reaction, e.g. with the monomer, with the catalyst, or after the introduction of the catalyst. Particles of an inorganic material, such as titanium dioxide which is suitable as a filler material in the polymer product may be used advantageously. However, for most purposes, the most suitable inert solid material is preformed polymer of identical composition as the polymer being made. The preformed polymer particles may be polymer which is previously produced and stored, e.g. from the same system, or may be polymer produced in the same run but brought into contact with fresh monomer by recycle or back mixing.

Suitably, the non-polymerizable solid material, e.g. the preformed polymer, is added to the polymerization zone shortly after the polymerization zone is initiated, e.g., within 10 minutes after the addition of the polymerization catalyst. One suitable range of proportions within which the non-polymerizable solid may be used is, for example, 5 to 18 wt. percent based on the total weight of initial reaction mixture including the non-solvent.

It is preferred that the discontinuous liquid trioxane-rich phase be present during the greater part of the polymerization reaction. However, it is not necessary that a discontinuous liquid phase be present in the final stages of the reaction.

Any of the catalysts known to be effective for the polymerization of trioxane into a tough, stable, moldable polymer may be used in accordance with this invention since the invention does not depend upon the nature of the catalyst. A substantial number of such catalysts are disclosed in U.S. Patent 2,989,505, referred to above. Among the most suitable catalysts are the boron fluoride-containing catalysts, including boron fluoride, itself, boron fluoride coordinate complexes with organic compounds in which oxygen or sulfur is the donor atom, boron fluoride coordinate complexes with water and boron fluoride coordinates complexes with weekly basic nitrogen or phosphorous compounds. Such catalysts are disclosed in U.S. Patents 2,989,507, 2,989,506 and 2,989,511 of June 20, 1961, and U.S. patent application S.N. 67,918, filed November 8, 1960.

Any inert non-solvent or mixture of inert non-solvents may be used in the process of this invention. The preferred non-solvents are normally liquid paraffinic hydrocarbons having at least 6 carbon atoms. (For convenience, liquids which are partial solvents for trioxane but which permit the existence of a separate liquid trioxane-rich phase are referred to herein as "non-solvents.") Mixtures of such hydrocarbons may be used, including petroleum fractions which contain high proportions of paraffins. Among the specific non-solvent liquids which may be used are n-heptane, isooctane (2,2,4-trimethylpentane), n-decane, Decalin and mineral oil. Advantageously, the continuous phase will contain a major proportion of such non-solvent.

Because of the limited miscibility of trioxane with many of the non-solvents which can be employed in carrying out the process, the discontinuous trioxane-rich phase will often contain a minor amount of non-solvent, while the continuous non-solvent-rich phase will often contain trioxane. Moreover, at atmospheric pressure, there is generally a temperature at which the process may be carried out such that solid trioxane may be present in addition to the trioxane-rich and non-solvent-rich liquid phases and the other solid phases which may be present. However, it is preferred to carry out the process at a somewhat higher temperature at which there is no solid trioxane in the reaction mixture.

A suitable range of proportions of non-solvent liquid is between about 0.25 and about 10 parts by weight per part of trioxane. In the case of partial solvents it is especially preferred that the amount of liquid be maintained at a low level so that the maximum proportion of trioxane will be in its own phase. A preferred range of proportions of non-solvent liquid is from about 0.4 to about 4 parts of liquid per part of trioxane, while a suitable temperature range is between about 46° C. and about 74° C. It should be noted, however, that the temperature and proportions necessary to maintain separate trioxane-rich and non-solvent-rich liquid phases will vary somewhat depending on the particular materials employed and specifically on the nature of the non-solvent being used.

In accordance with another aspect of this invention copolymerization of trioxane with a cyclic ether having adjacent carbon atoms takes place in a two phase liquid suspension of a trioxane-rich phase in a continuous non-solvent-rich phase. The preferred comonomers are the cyclic ethers containing oxyethylene groups such as ethylene oxide or dioxolane. Other satisfactory comonomers are disclosed in Patent No. 3,027,352 of Walling et al.

One suitable range of proportions of comonomer used in the reaction mixture is for example from about 0.5 to about 10 weight percent based on the weight of trioxane. In most cases, the comonomer will distribute itself between the trioxane-rich and non-solvent rich liquid phases. However, as the co-monomer is used up in the trioxane-rich phase due to polymerization, comonomer will shift into this phase from the non-solvent rich phase until the entire trioxane-rich phase disappears.

The copolymerization reaction is advantageously carried out by employing a non-polymerizable solid material as described above. When carrying out a copolymerization reaction with the use of a non-polymerizable solid material, preferred ranges of materials making up the total reaction mixture are from 28 to 60 wt. percent of trioxane, from 0.5 to 7.0 wt. percent of comonomer, e.g. ethylene oxide, from 66.5 to 15 wt. percent of non-solvent, e.g. inert hydrocarbon liquid, and from 5.0 to 18.0 wt. percent of substantially non-polymerizable solid material, e.g., preformed copolymer particles.

The process of this invention including the use of substantially non-polymerizable solid material, makes possible more efficient transfer of heat given off by the polymerization reaction due to a considerable lessening of buildup of polymer on the reactor walls. This allows for better temperature control of the reactor. Thus, for any given type of polymerization system, the process may be carried out to produce polymer at higher rates and thus liberate heat at greater rates while maintaining adeqaute temperature control, than if no substantially non-polymerizable, solid material is employed.

The following examples further illustrate the invention:

Example I

A water-jacketed stirred reactor was charged with trioxane and n-heptane in a 2.33/1 weight ratio, with 3 wt. percent (based on the weight of trioxane) of ethylene oxide and with 100 p.p.m. of boron fluoride dibutyl etherate (based on trioxane and on the $BF_3$ content of the complex). The interior surface of the reactor was sprayed with mold lubricant to reduce adhesion of polymer to the reactor walls. Nevertheless sufficient polymer adhered to the walls to make temperature control difficult and the temperature varied from 55 to 64° C. After a run of 1.5 hours the polymer yield was 73%.

Example II

The procedure of Example I was repeated except that 10 wt. percent based on the weight of the monomeric mixture of a previously prepared copolymer of the same monomeric mixture was added to the reactor 3 minutes after the addition of the catalyst. The interior surface of the reactor was not sprayed with mold lubricant in this case. The buildup of polymer on the reactor walls was substantially less and it was possible to limit the temperature fluctuation to the range between 55° and 58.5° C. After a run of 1.3 hours, the yield was 78 wt. percent of the initially charged monomers.

It is to be understood that the foregoing detailed description is given merely by way of illustration and that many variations may be made therein without departing from the spirit of our invention.

Having described our invention what we desire to secure by Letters Patent is:

1. In the catalytic polymerization of trioxane in a suspension system comprising a discontinuous liquid trioxane-rich phase suspended in a continuous phase comprising an inert non-aqueous liquid which is at least partially a non-solvent for trioxane, the improvement which comprises contacting the polymerizing mass in a unit of space of said suspension system with finely-divided particles of suspended substantially non-polymerizable solid material brought into said unit of space from a source outside of said unit of space, said finely-divided particles being present in the suspension system during the major portion of the polymerization reaction.

2. In the catalytic polymerization of trioxane in a suspension system comprising a discontinuous liquid trioxane-rich phase suspended in a continuous phase comprising an inert non-aqueous liquid which is at least partially a non-solvent for trioxane, the improvement which comprises contacting the polymerizing mass in a unit of space of said suspension system with finely-divided particles of suspended preformed oxymethylene polymer brought into said unit of space from a source outside of said unit of space, said finely-divided particles being present in the suspension system during the major portion of the polymerization reaction.

3. In the catalytic copolymerization of trioxane and a cyclic ether having adjacent carbon atoms in a suspension system comprising a discontinuous liquid trioxane-rich phase suspended in a continuous phase comprising an inert non-aqueous liquid which is at least partially a non-solvent for trioxane, the improvement which comprises adding finely-divided particles of suspended substantially non-polymerizable solid material from a source outside of said suspension system such that said solid material is present in said suspension system during the major portion of the polymerization reaction.

4. In the catalytic copolymerization of trioxane and a cyclic ether having adjacent carbon atoms in a suspension system comprising a discontinuous liquid trioxane-rich phase suspended in a continuous phase comprising an inert non-aqueous liquid which is at least partially a non-solvent for trioxane, the improvement which comprises contacting the polymerizing mass in a unit of space of said suspension system with divided particles of suspended preformed oxymethylne copolymer brought into said unit of space from a source outside of said unit of space, said finely-divided particles being present in the suspension system during the major portion of the polymerization reaction.

5. In the catalytic copolymerization of trioxane and ethylene oxide in a suspension system comprising a discontinuous liquid trioxane-rich phase suspended in a continuous phase comprising an inert liquid hydrocarbon which is at least partially a non-solvent for trioxane, the improvement which comprises contacting the polymerizing mass in a unit of space of said suspension system with finely-divided particles of suspended preformed oxymethylene copolymer brought into said unit of space from a source outside of said unit of space, said finely-divided particles being present in the suspension system during the major portion of the polymerization reaction.

6. The copolymerization process of claim 5 wherein the polymerization takes place in the presence of a boron fluoride containing catalyst.

7. The copolymerization process of claim 5 wherein the copolymerization system contains from 28 to 60 weight percent of trioxane, from 0.5 to 7.0 weight percent of ethylene oxide, from 66.5 to 15 weight percent of inert hydrocarbon liquid and from 5.0 to 18.0 weight percent of preformed copolymer particles.

(References on following page)

References Cited by the Examiner

UNITED STATES PATENTS

| | | | |
|---|---|---|---|
| 2,121,695 | 6/1938 | Hill | 260—2 |
| 2,278,878 | 4/1942 | Hoff | 260—37 |
| 2,844,561 | 7/1958 | Bechtold et al. | 260—67 |
| 2,989,505 | 6/1961 | Hudgin et al. | 260—67 |
| 3,007,897 | 11/1961 | Behrends et al. | 260—67 |
| 3,027,352 | 3/1962 | Walling et al. | 260—67 |
| 3,030,338 | 4/1962 | Aries | 260—67 |
| 3,091,599 | 5/1962 | Jean | 260—67 |
| 3,118,859 | 1/1964 | Delassus et al. | 260—67 |

FOREIGN PATENTS

| | | |
|---|---|---|
| 1,252,858 | 12/1960 | France. |
| 921,503 | 3/1963 | Great Britain. |
| 938,426 | 10/1963 | Great Britain. |
| 938,428 | 10/1963 | Great Britain. |

WILLIAM H. SHORT, *Primary Examiner.*

L. M. MILLER, H. D. ANDERSON,
*Assistant Examiners.*